US009512762B2

(12) United States Patent
Roberts, Jr. et al.

(10) Patent No.: US 9,512,762 B2
(45) Date of Patent: Dec. 6, 2016

(54) INTERNAL COMBUSTION ENGINE HAVING DEDICATED CYLINDER(S) FOR GENERATION OF BOTH EGR AND EXHAUST AFTERTREATMENT REDUCTANT FOR NOX-REDUCING CATALYST (71) Applicant: Southwest Research Institute, San Antonio, TX (US)

(72) Inventors: Charles E. Roberts, Jr., Helotes, TX (US); Cary A. Henry, Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 14 days.

(21) Appl. No.: 14/459,135

(22) Filed: Aug. 13, 2014

(65) Prior Publication Data
US 2016/0047287 A1    Feb. 18, 2016

(51) Int. Cl.
*F02M 26/00*    (2016.01)
*F01N 3/10*    (2006.01)
(Continued)

(52) U.S. Cl.
CPC ............ *F01N 3/2066* (2013.01); *F01N 3/2073* (2013.01); *F01N 13/009* (2014.06); *F01N 13/011* (2014.06); *F01N 13/107* (2013.01); *F02B 33/34* (2013.01); *F02B 37/127* (2013.01); *F02B 37/18* (2013.01); *F02B 39/04* (2013.01); *F02M 26/05* (2016.02); *F02M 26/15* (2016.02); *F02M 26/43* (2016.02); *F01N 2240/25* (2013.01); *F01N 2610/06* (2013.01); *Y02T 10/22* (2013.01); *Y02T 10/24* (2013.01)

(58) Field of Classification Search
CPC ............ F02M 25/0718; F02M 25/0742; F02M 25/074; F02M 26/05; F02M 26/15; F02M 26/43; F01N 13/02; F01N 3/0814; F01N 3/0842; F01N 3/2066; F01N 13/009; F01N 13/011; F01N 13/107; F01N 3/2073; F01N 2240/25; F01N 2610/06; F02B 37/127; F02B 37/18; Y02T 10/22; Y02T 10/24
USPC .................................................. 60/278, 301
See application file for complete search history.

(56) References Cited

U.S. PATENT DOCUMENTS 6,119,452 A *  9/2000  Kinugasa ........... B01D 53/8696
                                                       123/443
8,006,481 B2 *  8/2011  Schmieg ................. F01N 3/208
                                                       60/274

(Continued)

Primary Examiner — Thomas Denion
Assistant Examiner — Diem Tran
(74) Attorney, Agent, or Firm — Livingston Law Firm (57) ABSTRACT An exhaust gas recirculation (EGR) system for an internal combustion engine having dedicated EGR and operating at a lean air-fuel ratio. In such engines, one or more cylinders is operable as a dedicated EGR cylinder, such that all of the exhaust produced by the dedicated EGR cylinder(s) may be recirculated to the engine's main (non dedicated) cylinders. Because the engine is lean burn, its exhaust aftertreatment system has a NOx-reducing device. An EGR loop is configured to recirculate EGR from the dedicated EGR cylinder (s) to the engine's intake manifold. A diversion line connects the EGR loop to the exhaust aftertreatment system, thereby delivering EGR as syngas for the NOx-reducing device. The syngas is used either directly as a reductant or to a catalyst that reduces the syngas to ammonia for use as a reductant.

8 Claims, 5 Drawing Sheets (51) Int. Cl.

| | | |
|---|---|---|
| F01N 3/20 | (2006.01) | |
| F01N 13/10 | (2010.01) | |
| F01N 13/00 | (2010.01) | |
| F02B 33/34 | (2006.01) | |
| F02B 37/18 | (2006.01) | |
| F02B 39/04 | (2006.01) | |
| F02B 37/12 | (2006.01) | |

(56) References Cited

U.S. PATENT DOCUMENTS

| | | | |
|---|---|---|---|
| 8,291,891 B2 | 10/2012 | Alger, II | |
| 8,490,387 B2 | 7/2013 | Schreiber | |
| 8,561,599 B2 | 10/2013 | Gingrich | |
| 8,996,281 B2 * | 3/2015 | Gingrich | F02D 41/0255 123/568.17 |
| 2008/0022666 A1 * | 1/2008 | Driscoll | F01N 3/035 60/286 |
| 2010/0211292 A1 * | 8/2010 | Geyer | F02M 26/43 701/108 |
| 2011/0072788 A1 * | 3/2011 | Ruona | F01N 3/023 60/276 |
| 2012/0204844 A1 | 8/2012 | Gingrich | |
| 2012/0260897 A1 * | 10/2012 | Hayman | F02D 41/005 123/568.2 |
| 2013/0220286 A1 | 8/2013 | Gingrich | |
| 2014/0142833 A1 | 5/2014 | Gingrich | |

* cited by examiner

INTERNAL COMBUSTION ENGINE HAVING DEDICATED CYLINDER(S) FOR GENERATION OF BOTH EGR AND EXHAUST AFTERTREATMENT REDUCTANT FOR NOX-REDUCING CATALYST

TECHNICAL FIELD OF THE INVENTION

This invention relates to internal combustion engines, and more particularly to such engines having one or more cylinders dedicated to production of recirculated exhaust.

BACKGROUND OF THE INVENTION

In an internal combustion engine system having dedicated EGR (exhaust gas recirculation), one or more cylinders of the engine are segregated and dedicated to operate in a rich combustion mode. As a result of the rich combustion, the exhaust gases from the dedicated cylinder(s) include hydrogen and carbon monoxide. Rich combustion products such as these are often termed "syngas".

Dedicated EGR engines use the syngas produced by the dedicated cylinder(s) in an exhaust gas recirculation (EGR) system. The hydrogen-rich syngas is ingested into the engine for subsequent combustion by the non-dedicated cylinders and optionally by the dedicated cylinder(s). Benefits of combustion with dedicated EGR are numerous, but include engine efficiency improvements and emissions improvements (reduction of NOx, carbon monoxide and particulate matter).

Dedicated EGR has been successfully used with engines that operate with stoichiometric combustion in the non-dedicated cylinders, whose exhaust exits into the exhaust treatment system of the engine. The stoichiometric exhaust allows very effective use of traditional three-way catalyst technology for emissions reductions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to various systems and methods for a dedicated EGR system in which the internal combustion engine is operated as a lean burn engine. The dedicated EGR system is installed in a vehicle, such as an automobile, that also has an exhaust aftertreatment system.

The hydrogen-rich dedicated EGR gas stream can be divided into two portions. One portion is used as EGR to improve engine efficiency and emissions, in a manner analogous to dedicated EGR for stoichiometric engines. The second portion is used as a hydrogen-rich feedgas (syngas) for a NOx-reducing exhaust aftertreatment system.

Dedicated EGR System for Stoichiometric Gasoline Engine (Prior Art)

Figure 1:
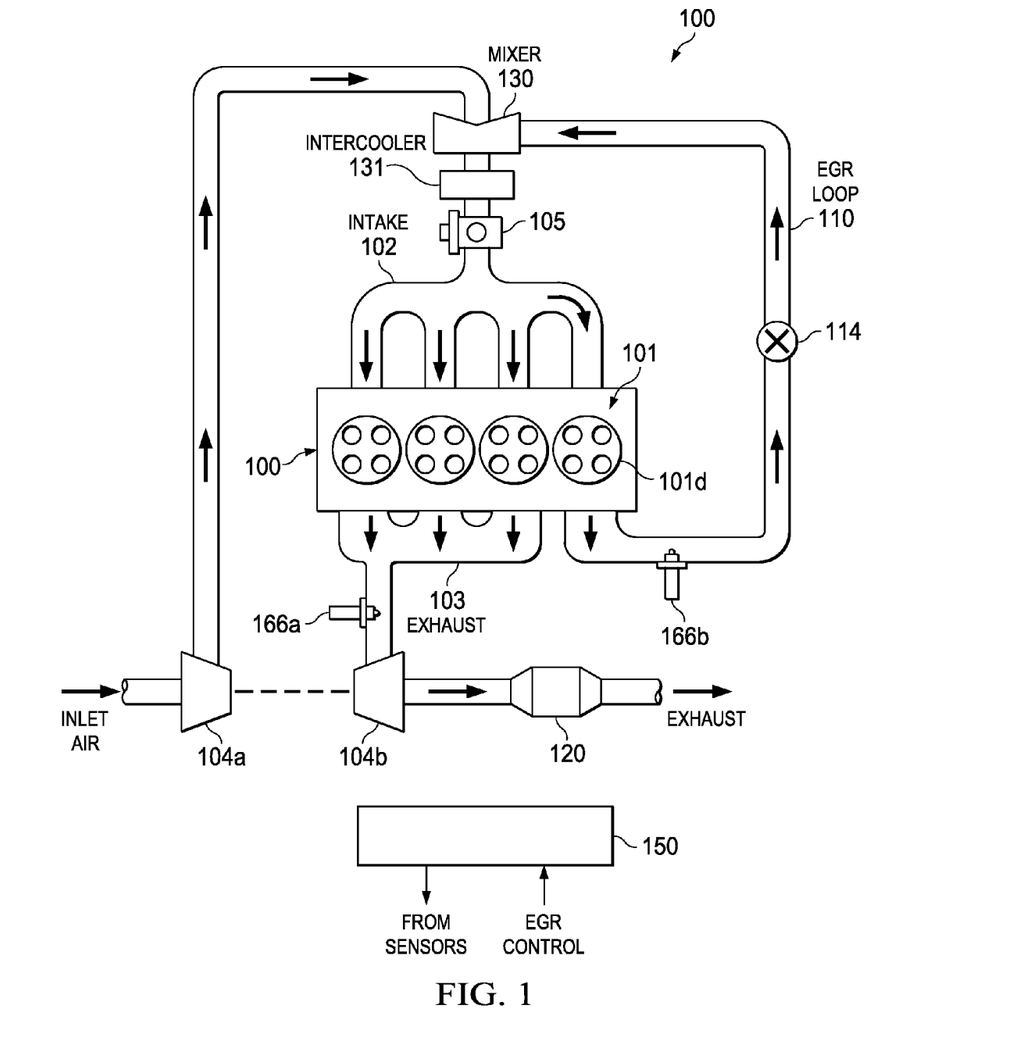
FIG. 1 illustrates a dedicated EGR system installed in a stoichiometric engine system.

FIG. 1 illustrates an internal combustion engine 100 having four cylinders 101. One of the cylinders is a dedicated EGR cylinder, and is identified as cylinder 101d. In the example of FIG. 1, engine 100 is gasoline-fueled and spark-ignited, with each cylinder 101 having an associated spark plug.

The dedicated EGR cylinder 101d may be operated at any desired air-fuel ratio. All of its exhaust is recirculated back to the intake manifold 102.

The other three cylinders 101 (referred to herein as the "main" or "non dedicated" cylinders) are operated at a stoichiometric air-fuel ratio. Their exhaust is directed to an exhaust aftertreatment system via an exhaust manifold 103.

Engine 100 is equipped with a turbocharger, specifically a compressor 104a and a turbine 104b. Although not explicitly shown, the cylinders have some sort of fuel delivery system for introducing fuel into the cylinders. This main fuel delivery system can be fumigated, port injected, or direct injected.

In the example of this description, the EGR line 110 joins the intake line downstream the compressor 104a. A mixer 130 mixes the fresh air intake with the EGR gas, and an intercooler 131 cools the mixture. A throttle 105 is used to control the amount of intake (fresh air and EGR) into the intake manifold 102.

An EGR valve (not shown) may be used to control the intake into the intake manifold 102. Alternatively, other means, such as variable valve timing, may be used to control EGR flow.

In other embodiments, there may be a different number of engine cylinders 101, and/or there may be more than one dedicated EGR cylinder 101d. In general, in a dedicated EGR engine configuration, the exhaust of a sub-group of cylinders is routed back to the intake of all the cylinders, thereby providing EGR for all cylinders. In some embodiments, the EGR may be routed to only the main cylinders.

After entering the cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104b, which drives compressor 104a. After turbine 104b, exhaust gas flows to an three-way catalyst 120, to be treated before exiting to the atmosphere.

As stated above, the dedicated EGR cylinder 101d can operate at any equivalence ratio because its exhaust will not exit the engine before passing through a non-dedicated EGR cylinder 101 operating at a stoichiometric air-fuel ratio. Because only stoichiometric exhaust leaves the engine, the exhaust aftertreatment device 120 may be a three-way catalyst.

To control the air-fuel ratio, exhaust gas may be sampled by an exhaust gas oxygen (EGO) sensor. Both the main exhaust line 122 and the EGR loop 110 may have a sensor (identified as 166a and 166b), particularly because the dedicated EGR cylinder may be operated at a different air-fuel ratio than non dedicated cylinders.

If a dedicated EGR cylinder is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as improving low speed peak torque results, due to increased EGR tolerance and the knock resistance provided by hydrogen (H2) and carbon monoxide (CO).

An EGR control unit 150 has appropriate hardware (processing and memory devices) and programming for controlling the EGR system. It receives data from the sensors described above, and performs various EGR control algorithms. It then generates control signals to the various valves and other actuators of the EGR system.

Dedicated EGR for Lean Burn Engines

As stated in the Background, in a dedicated EGR system, operation of the main cylinders at a stoichiometric air-fuel ratio allows use of three-way catalysts. However, stoichiometric engine operation is not without its shortcomings. As compared to engine operation at stoichiometric or rich air-fuel ratios, operation at lean air-fuel ratios generally results in improved overall fuel efficiency. Therefore, an interest exists in using lean combustion for fuel efficiency improvements.

One problem with lean combustion is that lean exhaust aftertreatment systems are generally more expensive than the three-way catalyst systems available for stoichiometric engines. Today, an efficient and accepted lean exhaust aftertreatment system is based upon a urea selective catalytic reduction (SCR) process, where ammonia is supplied on-demand to the aftertreatment system, as a reductant for NOx. Most SCR systems use liquid urea injection, in which urea is injected into the exhaust where the urea is vaporized and decomposed by hydrolysis to gaseous ammonia. Although urea-based or ammonia-based SCR systems are quite effective, they are complex and expensive.

Another type of exhaust aftertreatment device suitable for lean (NOx-laden) exhaust is a silver/alumina catalyst. A silver/alumina catalyst makes use of the H2 and CO in the syngas produced by a dedicated EGR cylinder to reduce NOx to acceptable emissions levels.

For purposes of this description, both an SCR device and a silver/alumina catalyst are referred to as "NOx reducing devices". An SCR device is an example of an ammonia-activated NOx reducing device, that is, it uses ammonia as a reductant. A silver/alumina catalyst is an example of an syngas-activated NOx reducing device. As explained below, the syngas may be either delivered directly to the NOx-reducing device or via a catalyst that converts the syngas to ammonia.

Also, for purposes of this description, the engine is referred to as a "lean burn" engine because its main cylinders normally operate with a lean air-fuel ratio. As explained above, the engine's dedicated EGR cylinder may be run at a different air-fuel ratio, which is typically rich for the production of syngas.

Dedicated EGR System for Lean Burn Engine with SCR Aftertreatment

Figure 2:
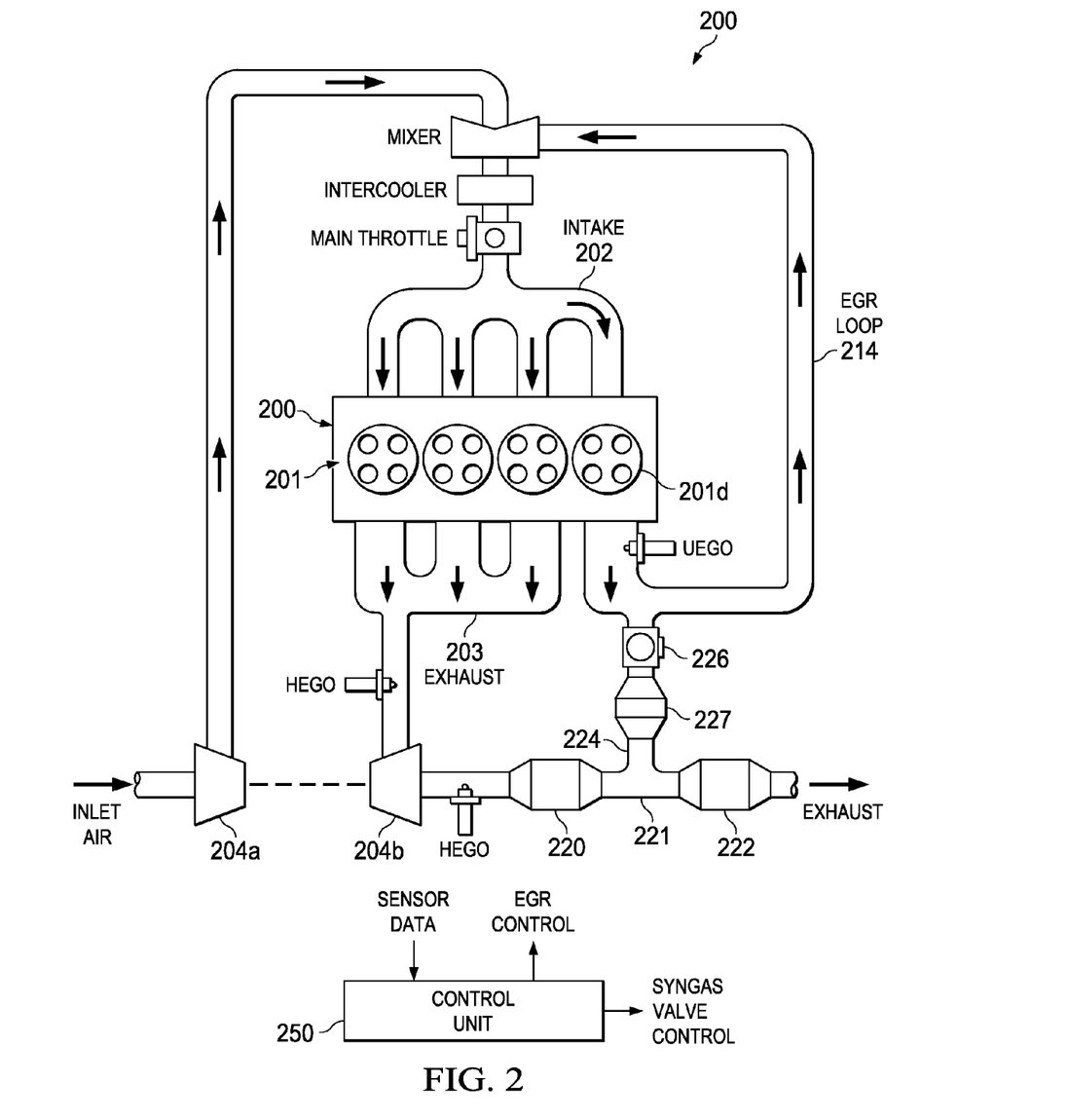
FIG. 2 illustrates a dedicated EGR system installed in a lean burn engine system, the engine system also having an exhaust aftertreatment system with an ammonia-activated NOx-reducing device.

FIG. 2 illustrates an EGR system configured for a lean combustion engine 200. In other words, the main cylinders 201 are operated with a lean air-fuel ratio.

In various respects, the EGR system is similar to that of FIG. 1. Engine 200 has one dedicated EGR cylinder 201*d* and three main cylinders 201. It has a compressor 204*a* and turbine 204*b* for providing charged intake to the intake manifold 202. An exhaust manifold 203 delivers lean exhaust to an exhaust aftertreatment system.

However, because engine 200 operates with a lean air-fuel ratio, the exhaust aftertreatment system must be capable of effectively treating NOx-laden exhaust in a lean environment. A three-way catalyst and lean NOx trap (TWC/LNT) device 220 is closely coupled to turbine 204*b*. The TWC/LNT device 220 may be implemented with various known technologies, and may be separately housed or integrated into a single device. By "closely coupled" is meant that the TWC/LNT device 220 is sufficiently near the turbine 204*b* so as to avoid a substantial loss of exhaust gas temperature.

An SCR device 222 is installed on the main exhaust line 221, downstream of the TWC/LNT device 220, typically as an underbody installation. As explained below, syngas produced by dedicated EGR cylinder 201*d* is used to provide reductant for the SCR device 222.

As in the example of FIG. 1, the dedicated EGR cylinder 201*d* is run at a rich air-fuel ratio. The air-fuel ratio for cylinder 201*d* is selected for the result of providing desired amounts of CO and H2 syngas.

The syngas generated by the dedicated EGR cylinder 201 is directed back to all cylinders 201 via an EGR loop 214. The operation and configuration of the EGR loop 214 is essentially the same as that of EGR loop 114 described above in connection with FIG. 1.

However, one modification to the EGR loop 214 is the diversion of a portion of the syngas to the exhaust aftertreatment system. A syngas supply line 224 connects the EGR loop 214 to the main exhaust line 221 at a point downstream the TWC/LNT device 220 and upstream the SCR device 222. As a result, syngas from the dedicated EGR cylinder 201*d* may flow into the main exhaust line 221 at a point upstream the SCR device 222.

A valve 226 and a three way catalyst 227 are installed on the syngas supply line 224. In the example of FIG. 2, valve 226 is upstream, relative to the flow of syngas, of three way catalyst 227. Three way catalyst 227 reacts with the syngas to produce NH3 (ammonia). This ammonia is delivered via syngas supply line 226 to the main exhaust line 221, where it subsequently flows into SCR catalyst 222. The SCR catalyst 222 uses the NH3 as a reductant in treating exhaust. The treated exhaust is then expelled into the atmosphere via the tailpipe.

A control unit 250 performs the same EGR control functions as described above for control unit 150. In addition, control unit 250 controls valve 226 to modulate the amount of syngas that is converted to ammonia by catalyst 227.

Figure 3:
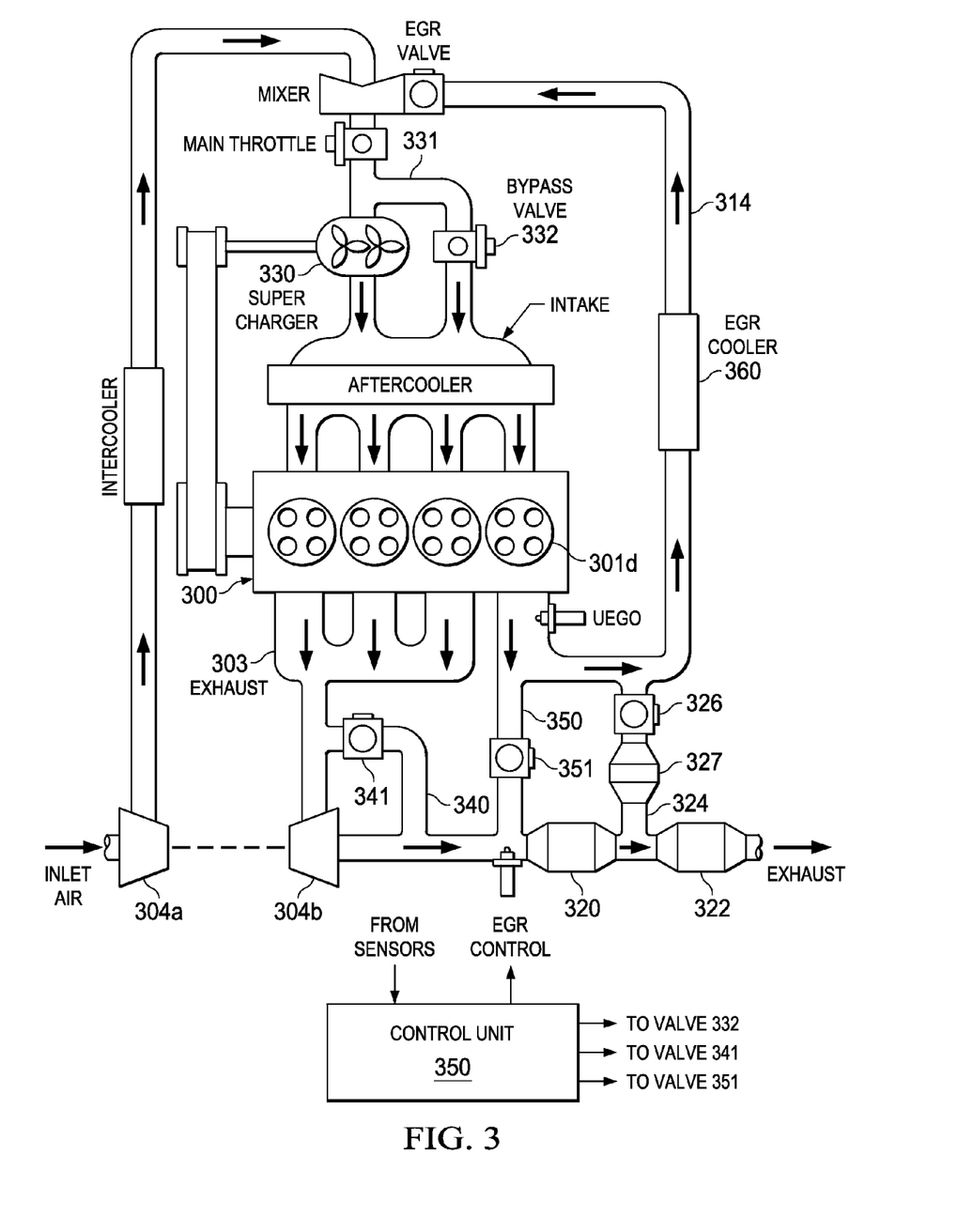
FIG. 3 illustrates the system of FIG. 2 with modifications.

FIG. 3 illustrates a modification of the embodiment of FIG. 2. As in FIG. 2, the engine 300 of FIG. 3 is a lean burn engine and has a similar exhaust aftertreatment system. That is, a TWC/LNT 320 is closely coupled to the turbine 304*b*, and an SCR 322 is supplied with ammonia via a supply line 324 that diverts a portion of dedicated EGR from the EGR loop 314.

A feature of the system of FIG. 3 is a supercharger 330, which provides improved performance at low-speed high-load conditions. A supercharger bypass line 331 allows supercharger 330 to be bypassed in certain engine operating conditions. Bypass valve 323 modulates how much intake air is bypassed around supercharger 330.

A turbine bypass line 340 bypasses exhaust from manifold 303 around turbine 304*a* in certain conditions, such as cold start. The flow of exhaust through bypass line 340 is modulated with a wastegate valve 341.

A cold-start bypass line 350 provides syngas to the exhaust system during cold start conditions. This provides quick light off of the TWC/LNT device 320. A valve 351 controls the flow through bypass line 350. Bypass line 350 connects the EGR loop 314 to a point upstream TWC/LNT device 320. The point of diversion of syngas into bypass line 350 is such that the syngas flowing through bypass line 350 is hot, such as between the exhaust manifold 303 and the EGR cooler 360.

EGR control unit 350 performs the additional tasks of controlling valves 332, 341 and 351. FIG. 3 further illustrates an EGR valve 390, controlled by control unit 350 and used to control flow of EGR to the intake manifold.

Figure 4:
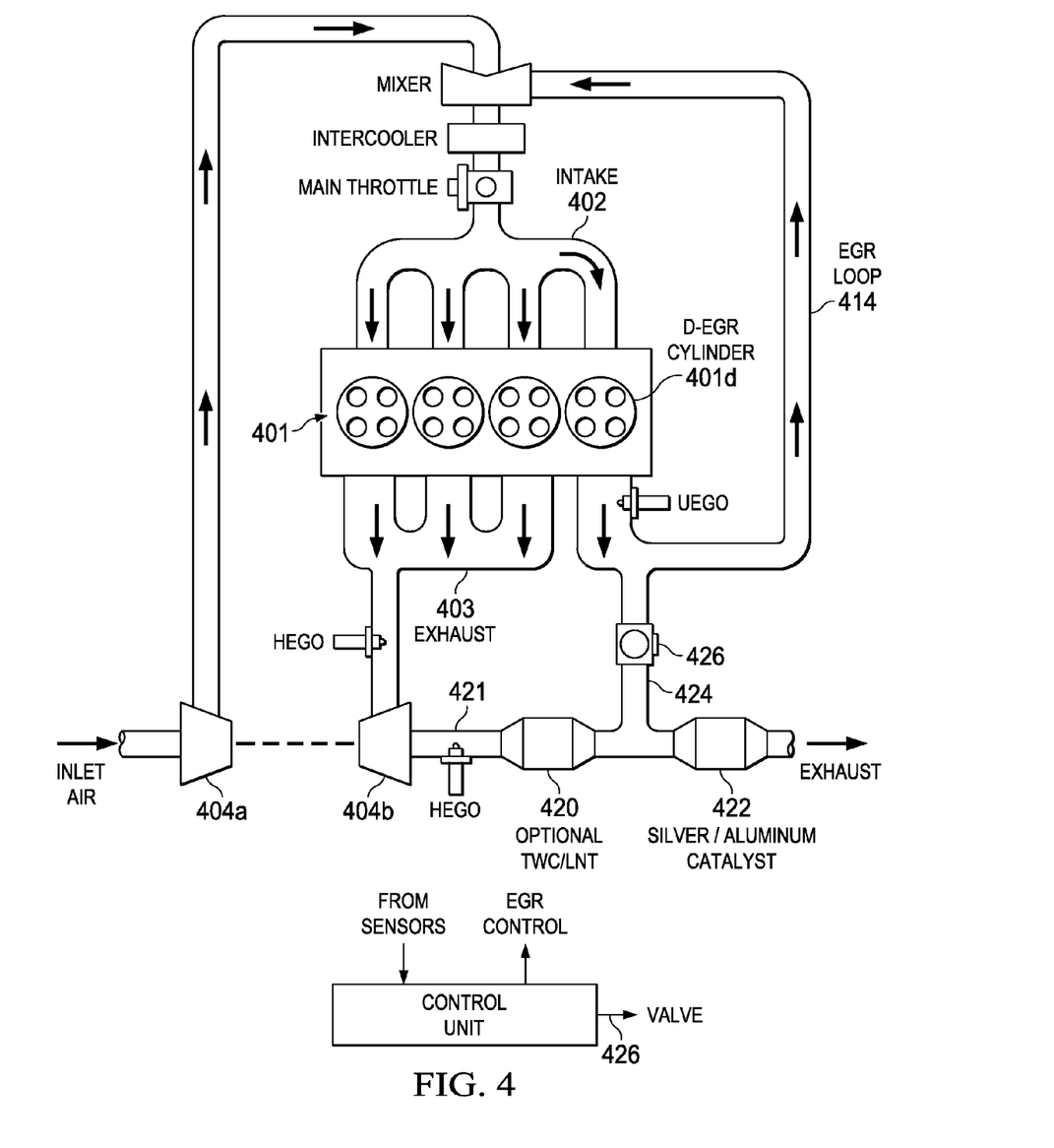
FIG. 4 illustrates a dedicated EGR system installed in a lean burn engine system, the engine system also having an exhaust aftertreatment system with a syngas-activated NOx-reducing device.

Dedicated EGR System for Lean Burn Engine with Silver/Alumina Catalyst Aftertreatment FIG. 4 illustrates another modification of the EGR system of FIG. 1, configured for a lean combustion engine 200. In other words, the main cylinders 401 are operated with a lean air-fuel ratio.

As in the embodiment of FIG. 2, in various respects, engine 400 is similar to engine 100. It has one dedicated EGR cylinder 401d and three main cylinders 401. It has a compressor 404a and turbine 404b for providing charged intake to the intake manifold 402. An exhaust manifold 403 delivers lean exhaust to an exhaust aftertreatment system.

As described above, because engine 400 operates with a lean air-fuel ratio, the exhaust aftertreatment system must be capable of effectively treating NOx-laden exhaust in a lean environment. An optional three-way catalyst and lean NOx trap (TWC/LNT) device 420 is closely coupled to turbine 404b. The TWC/LNT device 420 may be implemented with various known technologies, and may be separately housed or integrated into a single device.

A silver/alumina catalyst device 422 is installed on the main exhaust line 421, downstream the TWC/LNT device 420, typically as an underbody installation. As explained below, the H2 and CO in the syngas produced by dedicated EGR cylinder 401d is used to provide reductant for the catalyst 422.

As in the example of FIG. 1, the dedicated EGR cylinder 401d is run at a rich air-fuel ratio. The air-fuel ratio for cylinder 401d is selected for the result of providing desired amounts of CO and H2 syngas.

The syngas generated by the dedicated EGR cylinder 401d is directed back to all cylinders 401 via an EGR loop 414. The operation and configuration of the EGR loop 414 is essentially the same as that of EGR loop 114 described above in connection with FIG. 1.

As in the embodiment of FIG. 2, a modification to the EGR loop 414 is the diversion of a portion of the syngas to the exhaust aftertreatment system. A syngas supply line 424 connects the EGR loop 414 to the main exhaust line 421 at a point downstream the optional TWC/LNT device 420 and upstream the silver/alumina catalyst 422. As a result, syngas from the dedicated EGR cylinder 401d may flow into the main exhaust line 421 at a point upstream the catalyst 422.

A valve 426 is installed on the syngas supply line 424, to modulate the flow of syngas to catalyst 422. Catalyst 422 reacts with the syngas to reduce NOx. The treated exhaust is then expelled into the atmosphere via the tailpipe.

A control unit 450 performs the same EGR control functions as described above for control unit 150. In addition, control unit 450 controls valve 426 to modulate the amount of syngas that is delivered to catalyst 422.

Figure 5:
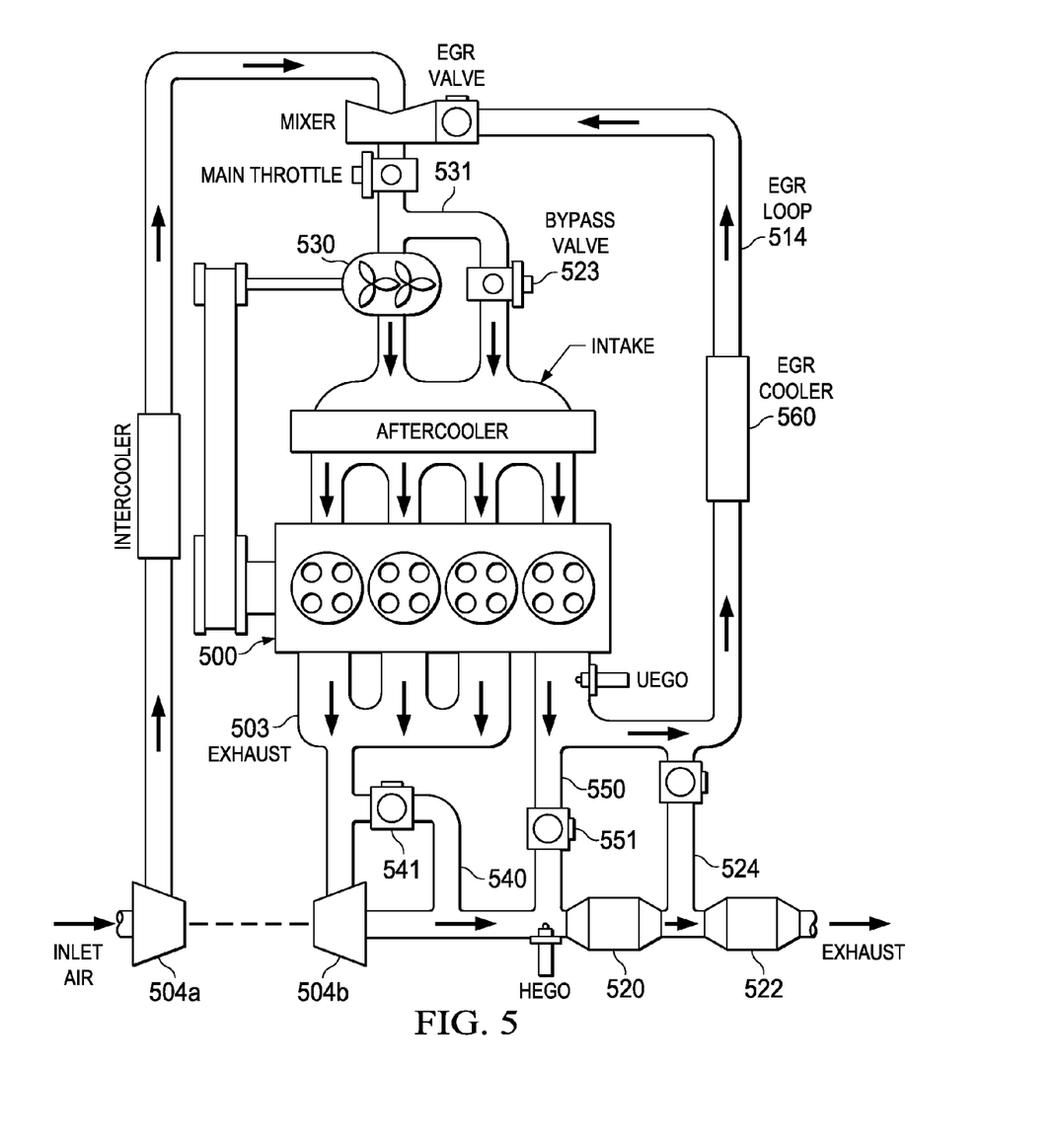
FIG. 5 illustrates the system of FIG. 4 with modifications.

FIG. 5 illustrates a modification of the embodiment of FIG. 4. As in FIG. 4, the engine 500 of FIG. 5 is a lean burn engine and has a similar exhaust aftertreatment system. That is, an optional TWC/LNT 520 is closely coupled to the turbine 504b, and a silver/alumina catalyst 522 is supplied with syngas via a supply line 524 that diverts a portion of dedicated EGR from the EGR loop 514.

As in FIG. 3, a feature of the system of FIG. 5 is a supercharger 530, which provides improved performance at low-speed high-load conditions. A supercharger bypass line 531 allows supercharger 530 to be bypassed in certain engine operating conditions. Bypass valve 523 modulates how much intake air is bypassed around supercharger 530.

A turbine bypass line 540 bypasses exhaust from manifold 503 around turbine 504b in certain engine operating conditions, such as cold start. The flow of exhaust through bypass line 540 is modulated with a wastegate valve 541.

A cold-start line 550 provides syngas to the exhaust system during cold start conditions. This provides quick light off of the TWC/LNT device 520. A cold start valve 551 controls the flow through bypass line 550. Bypass line 550 connects the EGR loop 314 to a point upstream TWC/LNT device 520 and catalyst 522. The point of diversion of syngas into bypass line 550 is such that the syngas flowing through bypass line 550 is hot, such as between the exhaust manifold 503 and the EGR cooler 560.

EGR control unit 550 performs the additional tasks of controlling valves 532, 541 and 551.

What is claimed is:

1. An exhaust gas recirculation (EGR) system for a lean burn internal combustion engine having a number of cylinders and having an exhaust aftertreatment system with at least a first three-way catalyst and an ammonia-activated NOx-reducing device, comprising:
    one or more cylinders operable as a dedicated EGR cylinder, such that all or part of the exhaust produced by the dedicated EGR cylinder(s) is recirculated to the engine's main (non dedicated) cylinders;
    an EGR loop for recirculating EGR from the dedicated EGR cylinder(s) to the engine's intake manifold;
    a diversion line connecting the EGR loop to the exhaust aftertreatment system at a point downstream the first three-way catalyst and upstream the NOx-reducing device;
    a second three-way catalyst installed on the diversion line; and
    a valve on the diversion line for modulating the flow of exhaust to the NOx-reducing device.

2. The system of claim 1, wherein the ammonia-activated NOx-reducing device is a selective catalytic reduction device.

3. The system of claim 1, wherein the engine is equipped with a turbine and wherein the exhaust aftertreatment system has a main exhaust line from which exhaust from the main cylinders exits the turbine, and wherein the first three way catalyst is closely coupled to the turbine.

4. The system of claim 1, further comprising a cold start line connecting the EGR loop to the exhaust aftertreatment system from a point near the beginning of the EGR loop to a point upstream of the NOx-reducing device.

5. A method of using an exhaust gas recirculation (EGR) system for a lean burn internal combustion engine, the engine having a number of cylinders and being equipped with an exhaust aftertreatment system with at least a first three-way catalyst and an ammonia-activated NOx-reducing device, comprising:
    operating one or more cylinders as a dedicated EGR cylinder, such that all or part of the exhaust produced by the dedicated EGR cylinder(s) is recirculated to the engine's main (non dedicated) cylinders;

providing an EGR loop for recirculating EGR from the dedicated EGR cylinder(s) to the engine's intake manifold;

connecting the EGR loop to the exhaust aftertreatment system via a diversion line, the diversion line connecting to the exhaust system downstream the first three-way catalyst and upstream the NOx-reducing device;

providing ammonia to the NOx-reducing device by means of a second three-way catalyst installed on the diversion line; and modulating, with a valve on the diversion line, the flow of syngas to the NOx-reducing device.

6. The method of claim 5, wherein the ammonia-activated NOx-reducing device is a selective catalytic reduction device.

7. The method of claim 5, wherein the engine is equipped with a turbine and wherein the exhaust aftertreatment system has a main exhaust line from which exhaust from the main cylinders exits the turbine, and wherein the first three way catalyst is closely coupled to the turbine.

8. The method of claim 5, further comprising connecting the EGR loop to the exhaust aftertreatment system with a cold start line, from a point near the beginning of the EGR loop to a point upstream of the NOx-reducing device.

* * * * *